(No Model.)
J. R. LITTLE & C. T. STODDARD.
SAW.
No. 354,325.　　　　　　　Patented Dec. 14, 1886.
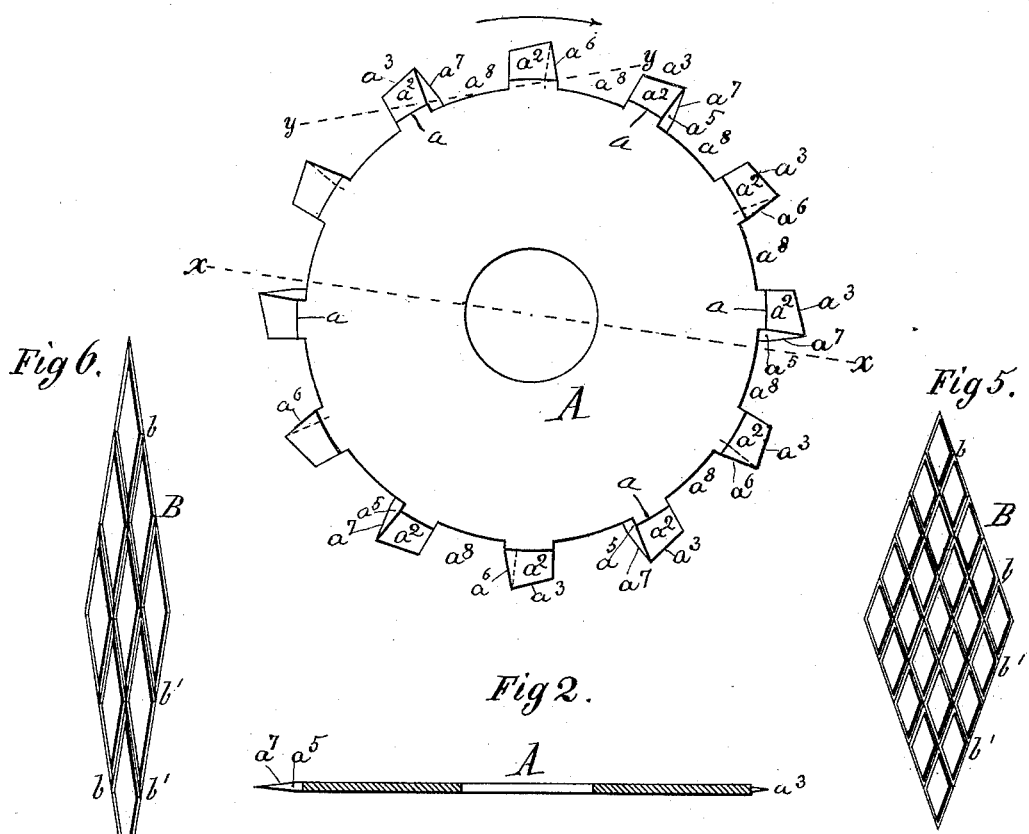
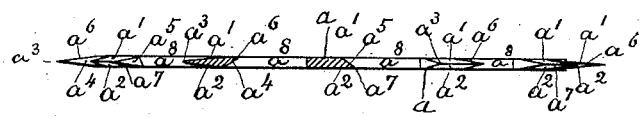
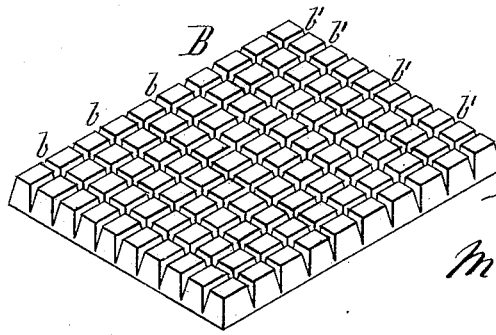
Witnesses:
J. P. Theo. Lang.
Robt. L. Fenwick
Inventor:
John R. Little
Calvin T. Stoddard
by their attys
Mason, Fenwick & Lawrence

UNITED STATES PATENT OFFICE.

JOHN R. LITTLE AND CALVIN T. STODDARD, OF WEST STEWARTSTOWN, ASSIGNORS OF ONE-THIRD TO JAMES I. PARSONS, OF COLEBROOK, NEW HAMPSHIRE.

SAW.

SPECIFICATION forming part of Letters Patent No. 354,325, dated December 14, 1886.

Application filed August 5, 1886. Serial No. 210,063. (No model.)

*To all whom it may concern:*

Be it known that we, JOHN R. LITTLE and CALVIN T. STODDARD, citizens of the United States, residing at West Stewartstown, in the county of Coos and State of New Hampshire, have invented certain new and useful Improvements in Saws for Cutting Tapering Kerfs in Wood in the Manufacture of Plugs for Nail-Holes, &c.; and we do hereby declare the following to be a full, clear, and exact description of the invention, such as will enable others skilled in the art to which it appertains to make and use the same.

Our invention relates to circular saws; and its object is to produce pyramidal frustums from a plain wood block, which pyramidal frustums are to be used for plugging up nail-holes or other imperfections in finished boards or timber, or for other useful purposes, and for which we have filed an application for a patent in the United States Patent Office on even date herewith.

In the drawings illustrating our invention, Figure 1 is a side elevation of our improved saw. Fig. 2 is a section in the line $x$ $x$ of Fig. 1, the remaining portions of the saw being shown in top view. Fig. 3 is a section in the line $y$ $y$ of Fig. 1, and Fig. 4 is a perspective view of a wood block cut into plugs of aforesaid shape by means of our improved saw; and Figs. 5 and 6 illustrate other forms of blocks sawed into diamond-shaped plugs.

A in the drawings represents a circular saw having teeth $a$, which stand in line with the body portion of the saw, and thus have no lateral clearance, like the teeth of a common circular saw.

The thickness of the saw A and its teeth differs from that of the common saw, inasmuch as it is much greater, in order to adapt the saw to the special work for which it is used, as will be seen. The end portions of the teeth $a$ are formed with slopes on opposite sides of the teeth, as $a'$ $a^2$, which slopes, in meeting, form an inclined central ridge, $a^3$, the highest point of which is at the forward or face portion of the tooth. The teeth $a$ are alternately provided with radial faces $a^4$ $a^5$, which stand oblique to the axis of the saw in two opposite directions. In consequence thereof, the face $a^4$ and slope $a'$ form a cutting-edge, $a^6$, on the right side of the saw, and the face $a^5$ and slope $a^2$ a cutting-edge, $a^7$, on the left side of the saw.

The teeth $a$ are so distributed on the saw-body as to leave spaces $a^8$ between them sufficiently large to provide for a free clearance for the chips made by the saw.

This saw is used to cut tapering kerfs or grooves $b$ $b'$ in a wood block, B, in order to form pyramidal frustums, as stated in our application for a patent for improvement in wood plugs for nail and other holes, filed on even date herewith. Said grooves being parallel, we may, in place of one saw, use as many saws in a suitably-constructed gang as there are grooves in a block, and we may have several gangs of saws set at distances answering different sizes of the pyramidal frustums to be made at different times, and the consequent changes of distances between grooves forming such frustums.

This saw A can be operated at a much greater speed than a common circular saw, inasmuch as its thickness secures great steadiness of motion, and the comparatively great distance apart of the teeth insures the free discharge of chips, and in consequence of the increased speed of its cutting-edges the surfaces formed by them are much smoother than those produced at an ordinary speed.

While our said saw is intended particularly to be used for cutting tapering grooves in the manufacture of wood plugs, as above stated, we intend to utilize it for cutting tapering kerfs in wood wherever the same may be needed.

We make no claim under this application for the plugs produced by the improved saw.

What we claim as our invention is—

The saw-plate A, comprising in its construction teeth $a$, formed with slopes on opposite sides of the teeth, as $a'$ $a^2$, said slopes when meeting forming an inclined central ridge, $a^3$, the highest point of which is at the forward or face portion of the tooth, and said teeth being alternately provided with radial faces $a^4$ $a^5$, standing obliquely to the axis of the saw-plate in two opposite directions, and forming by means of the face $a^4$ and slope $a'$ a cutting-edge, $a^6$, on the right side of the saw-plate, and by the face $a^5$ and slope $a^2$ a cutting-edge, $a^7$, on the left side of the saw-plate, said teeth having clearing-spaces $a^8$ between them, all substantially as and for the purpose described.

In testimony whereof we affix our signatures in presence of two witnesses.

JOHN R. LITTLE.
CALVIN T. STODDARD.

Witnesses:
PHIL FERGUSSON,
E. W. INGHAM.